US009795128B1

(12) United States Patent
Mende

(10) Patent No.: US 9,795,128 B1
(45) Date of Patent: Oct. 24, 2017

(54) FLY REPELLENT SYSTEM

(71) Applicant: Jared L. Mende, Hamden, CT (US)

(72) Inventor: Jared L. Mende, Hamden, CT (US)

(*) Notice: Subject to any disclaimer, the term of this patent is extended or adjusted under 35 U.S.C. 154(b) by 169 days.

(21) Appl. No.: 14/962,932

(22) Filed: Dec. 8, 2015

Related U.S. Application Data

(60) Provisional application No. 62/089,702, filed on Dec. 9, 2014.

(51) Int. Cl.
*A01M 29/08* (2011.01)
(52) U.S. Cl.
CPC .................................. *A01M 29/08* (2013.01)
(58) Field of Classification Search
CPC ............................ A01M 1/023; A01M 1/103
See application file for complete search history.

(56) References Cited

U.S. PATENT DOCUMENTS

| | | | | |
|---|---|---|---|---|
| 4,144,832 | A * | 3/1979 | Dahl | A01M 29/08 |
| | | | | 116/22 A |
| 5,505,017 | A | 4/1996 | Nelson et al. | |
| 6,543,180 | B2 | 4/2003 | Pace | |
| 6,557,482 | B1 * | 5/2003 | Doty, III | A01M 29/06 |
| | | | | 116/150 |
| D631,188 | S | 1/2011 | Lovegrove | |
| 2002/0116864 | A1 * | 8/2002 | Pace | A01M 29/08 |
| | | | | 43/107 |
| 2003/0145793 | A1 | 8/2003 | Mathews et al. | |
| 2006/0162235 | A1 | 7/2006 | Shih et al. | |
| 2007/0141945 | A1 * | 6/2007 | Chipman | A01M 29/06 |
| | | | | 446/72 |
| 2007/0251460 | A1 * | 11/2007 | Olsen | A01M 29/08 |
| | | | | 119/61.53 |
| 2009/0031612 | A1 | 2/2009 | Hubbard et al. | |
| 2010/0236470 | A1 * | 9/2010 | Doty, III | A01M 29/06 |
| | | | | 116/22 A |
| 2011/0219664 | A1 * | 9/2011 | Casteel | A01M 29/08 |
| | | | | 43/107 |
| 2014/0153121 | A1 * | 6/2014 | Savage | A01M 29/08 |
| | | | | 359/850 |

* cited by examiner

*Primary Examiner* — Christopher P Ellis

(57) ABSTRACT

A fly repellent system for repelling flies. A liquid-filled sphere is partially disposed inside a cone. The sphere is secured to the cone by an arc-shaped ring pivotally attached to a bottom edge of the cone. Apertures are disposed at or near a top edge of the cone. The top edge of the cone is disposed within a cover cone such that the cover cone partially covers apertures. A light source is disposed through the top edge of the cover cone. The light source has a switch is operatively connected to a battery that is operatively connected to a plurality of lights. A mounting ring may suspend the system. When the lights are turned "on", the cover cone directs the light through the apertures to illuminate the liquid in the sphere. The illuminated sphere repels flies.

4 Claims, 4 Drawing Sheets

FLY REPELLENT SYSTEM

CROSS REFERENCE

This application is a non-provisional of and claims priority to U.S. Provisional Patent Application No. 62/089,702, filed Dec. 9, 2014, the specification(s) of which is/are incorporated herein in their entirety by reference.

FIELD OF THE INVENTION

The present invention is directed to a system for ridding an area of flies.

BACKGROUND OF THE INVENTION

Many chemicals or devices have been made to trap and/or kill flies. The present invention features a novel fly repellent system. The system repels flies and helps to rid the area of the flies. The system features a water-filled bowl that hangs (e.g., from a ceiling). The bowl reflects light, which annoys flies and repels them.

SUMMARY

The present invention features a fly repellent system. In some embodiments, the fly repellent system for repelling flies comprises a sphere, wherein a hemispherical protrusion extends upwardly from the top end the sphere, the inner cavity of the sphere and the hemispherical protrusion are fluidly connected, the inner cavity of the sphere and the hemispherical protrusion are filled with a liquid; a cone having a bottom edge and an inner cavity and a plurality of apertures disposed at or near a top edge, the bottom edge of the cone is adapted to accept at least the hemispherical protrusion of the sphere and a portion of the sphere is visible below the bottom edge of the cone; an arc-shaped ring having a first end and a second end, the first end and the second end are pivotally attached to the bottom edge of the cone opposite each other; a cover cone that is smaller in size than the cone, wherein the cover cone bottom edge receives the top edge of the cone such that the cover cone partially covers the plurality of apertures; and a light source comprising a switch operatively connected to a battery disposed inside the light source, and a plurality of lights operatively connected to the battery and disposed at a bottom end of the light source.

In some embodiments, the liquid is water. In some embodiments, the cone is constructed from a material comprising metal. In some embodiments, the system further comprises a mounting ring, wherein the mounting ring is a closed ring with a hollow center.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
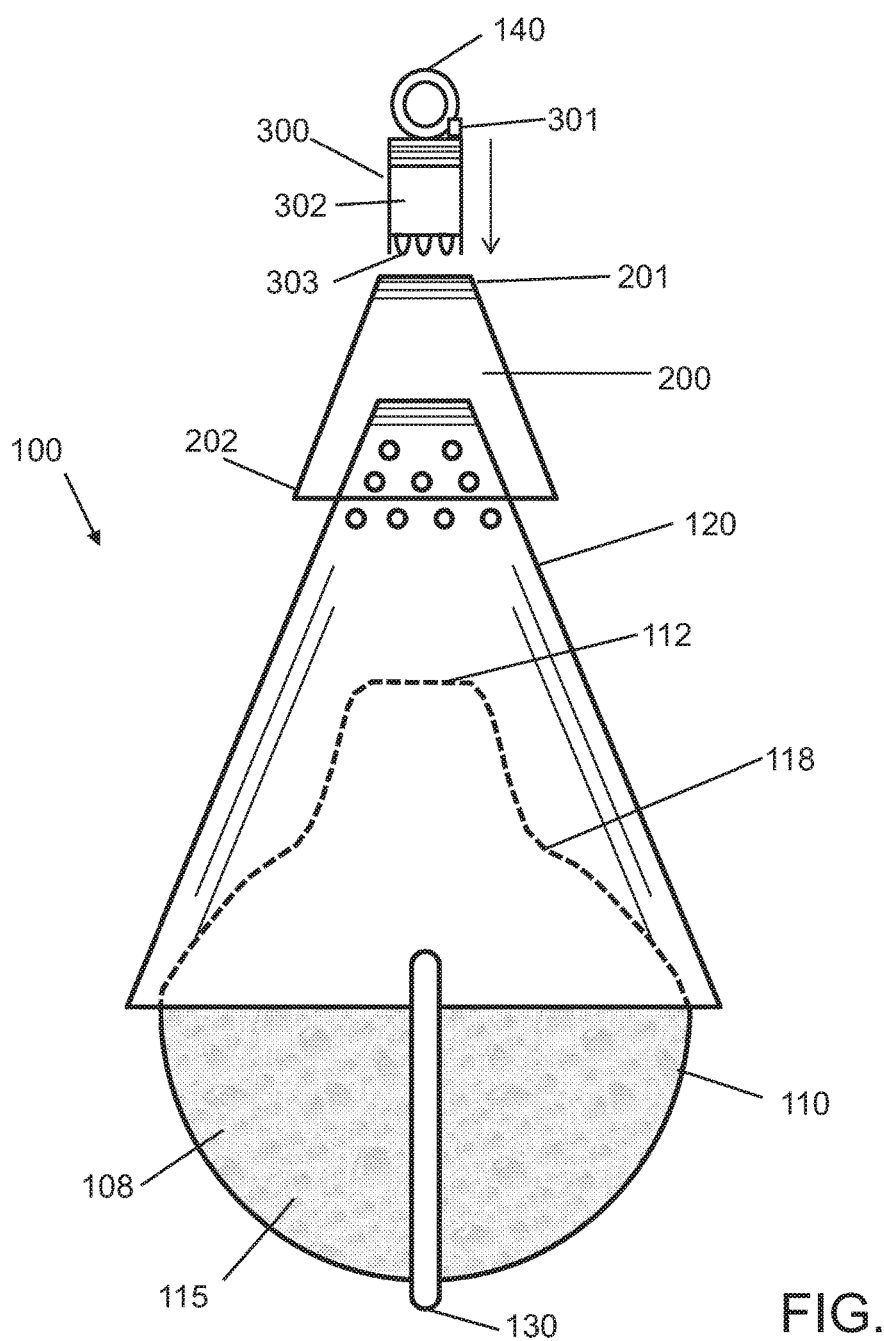
FIG. 1 is an exploded view of the system of the present invention.
Figure 2:
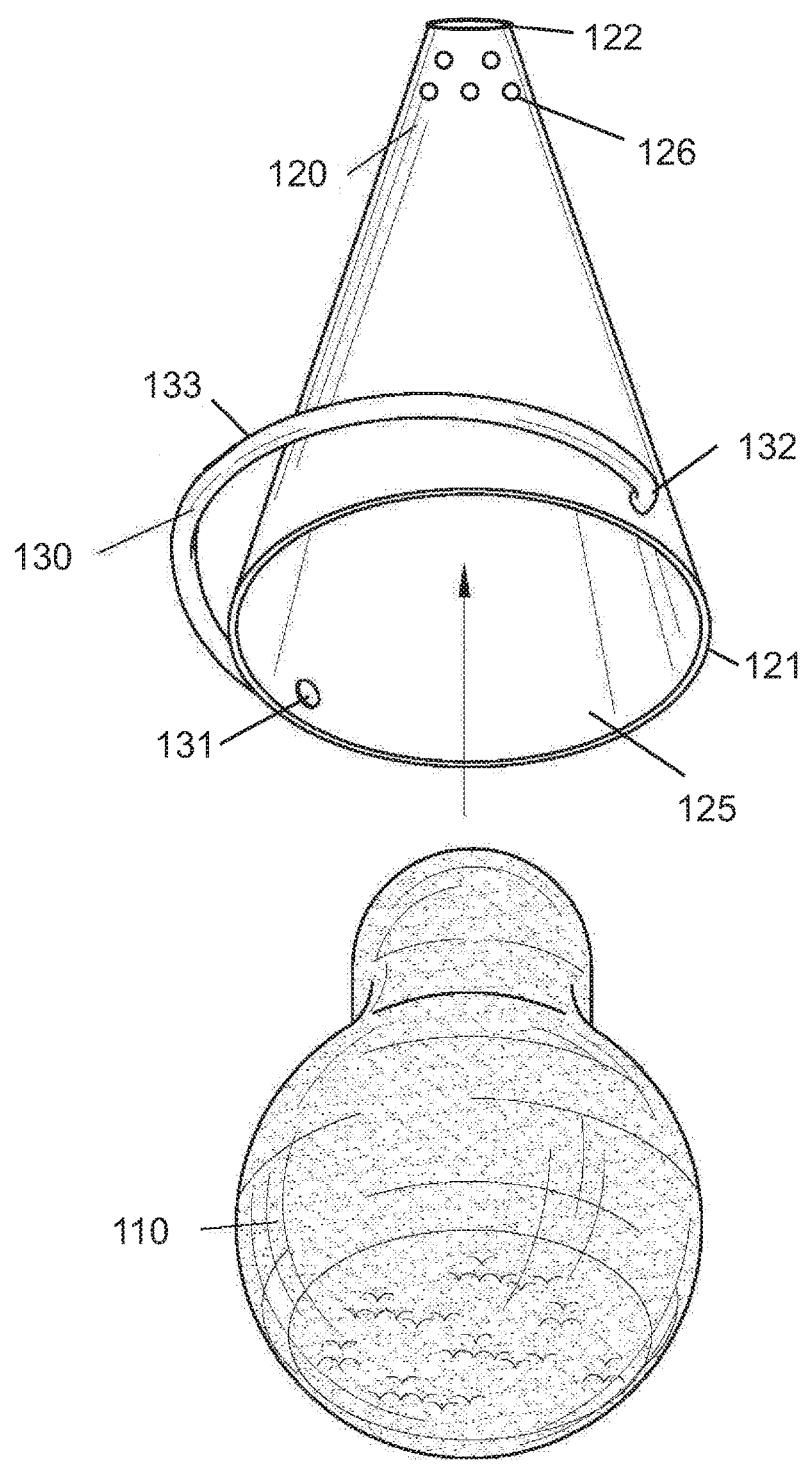
FIG. 2 is an exploded view of the system of the present invention.
Figure 3:
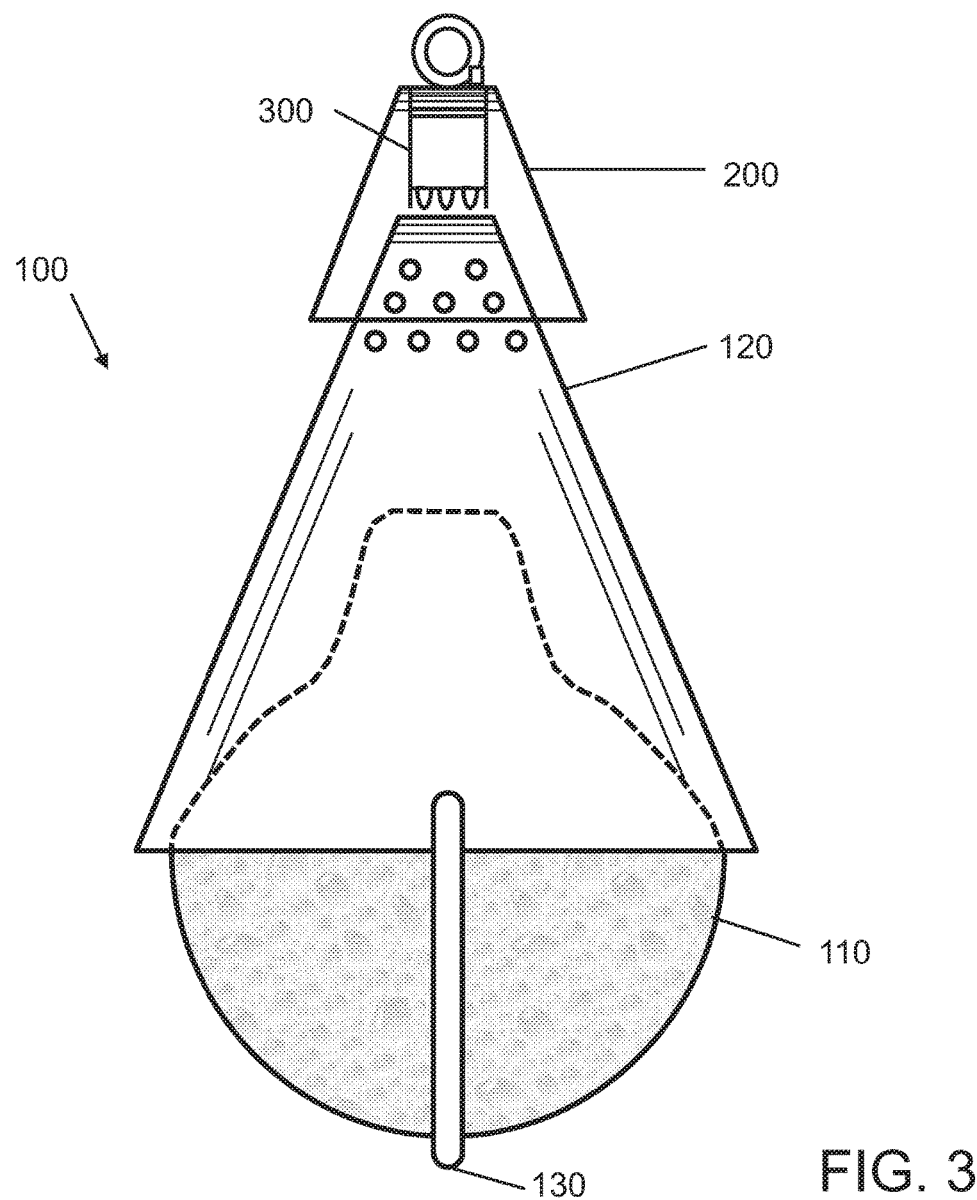
FIG. 3 is a side view of the system of the present invention.
Figure 4:
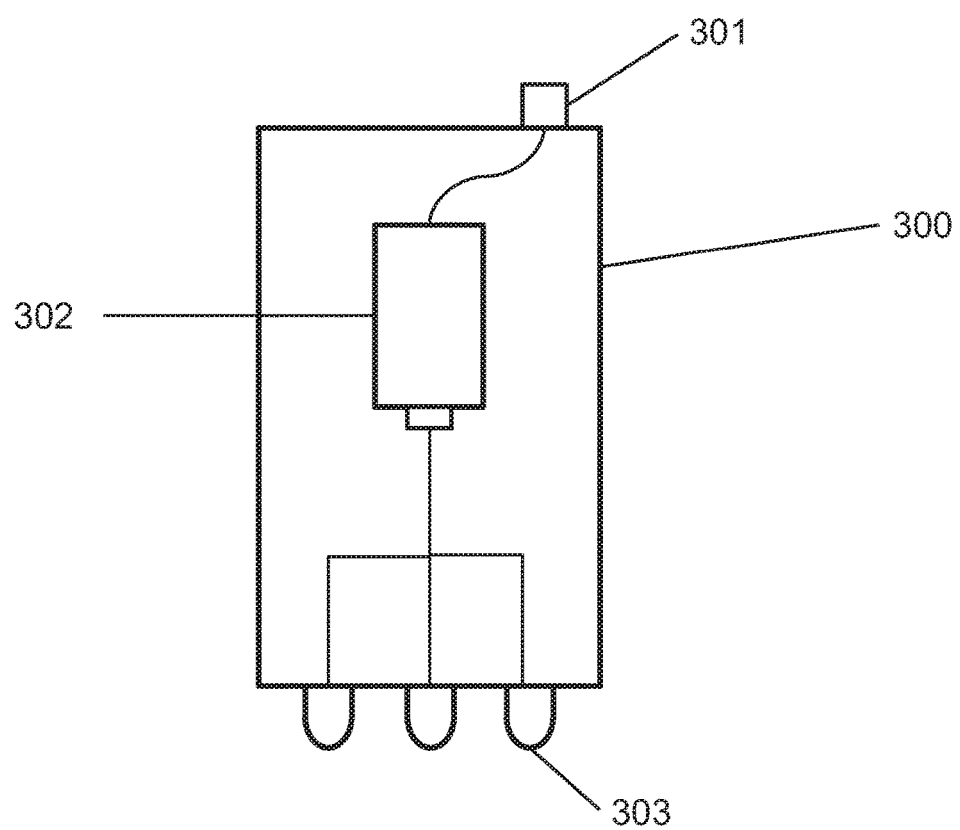
FIG. 4 is a schematic of the light source of the system.

Referring now to FIG. 1-4, the present invention features a fly repellent system 100. The system 100 comprises a sphere 110 having an inner cavity 115 and a hemispherical protrusion 118 (with an inner cavity) that extends downwardly from its top end 112. The sphere 110 and hemispherical protrusion 118 are fluidly connected (e.g., they share inner cavities). The sphere 110 (and protrusion 118) resembles a light bulb in shape. Light bulbs are well known to one of ordinary skill in the art. In some embodiments, the sphere 110 (and protrusion 118) resembles a brown light bulb. The inner cavities 115 of the sphere 110 and protrusion 118 are filled with a liquid 108 (e.g., water).

The system 100 further comprises a cone 120 having a bottom edge 121 (e.g., circular top edge), a top end 122 (e.g. generally pointed end), and an inner cavity 125. The cone 120 is generally hollow and the bottom end is open such that at least the hemispherical protrusion of the sphere 110 can be inserted into the inner cavity 125 of the cone 120. In some embodiments, a portion of the sphere 110 (e.g., above the hemispherical protrusion 118 inserts into the inner cavity 125 of the cone 120. In some embodiments, the cone 120 is constructed from a material comprising metal (e.g., stainless steel). In some embodiments, a plurality of apertures 126 is disposed at or near the top edge 122.

The system 100 further comprises an arc-shaped ring 130 (e.g., semi-circular) attached to the top edge 121 of the cone 120 as shown in FIG. 1. The arc-shaped ring 130 has a first end 131 and a second end 132. The ends 131, 132 are pivotally attached to the cone 120 opposite each other (e.g., see FIG. 2). The arc-shaped ring 130 can pivot in a first direction and a second direction over the sphere 110.

In some embodiments, the system further comprises a cover cone 200 having a cover cone bottom edge 201 and a cover cone top edge 202. In some embodiments, the cover cone 200 is smaller in size than the cone 120. In some embodiments, the cover cone bottom edge 201 receives the top edge 122 of the cone 120 such that the cover cone 200 partially covers the plurality of apertures 126.

In some embodiments, the system further comprises a light source 300. In some embodiments, the light source comprises a switch (301) operatively connected to a battery (302) disposed inside the light source (300), and a plurality of lights (303) operatively connected to the battery (302) and disposed at a bottom end of the light source (300).

In some embodiments, the light source is at least partially disposed inside the cover cone 200. In some embodiments, the light source 300 is attached to the cover cone 200 by a first attachment means. In some embodiments, the cover cone 200 is attached the cone 120 by a second attachment means. In some embodiments, the first or second attachment means may be hardware such as screws, nuts, and bolts, or a mated-threading system, or adhesives.

In some embodiments, when the light source is turned "on" via the switch (301), the cover cone (300) directs a light emitted by the plurality of lights (303) through the apertures and into the inner cavity (125) of the cone (120). In some embodiments, the light illuminates the liquid (108) inside the sphere (110) that repels flies.

In some embodiments, the system further comprises a mounting ring 140. In some embodiments, the mounting ring is disposed at the top end of the light source. The mounting ring 140 is a closed ring with a hollow center. A user can thread string or rope (or a hook, etc.) through the mounting ring 140 to mount the system 100 where desired.

The liquid 108 (e.g., water) in the sphere 110 reflects light, which annoys flies and causes them to leave and/or avoid the room or area.

The system 100 of the present invention may be constructed in a variety of sizes, shapes, styles, colors, and designs.

The disclosures of the following U.S. patents are incorporated in their entirety by reference herein: U.S. Pat. No. 5,505,017; U.S. Pat. No. 6,543,180; U.S. Design Pat. No. D631188; U.S. Patent Application No. 2003/0145793; U.S. Patent Application No. 2006/0162235; U.S. Patent Application No. 2009/0031612.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A fly repellent system (100) for repelling flies, said system (100) comprising:
   (a) a sphere (110) having an inner cavity (115) and a top end (112), wherein a hemispherical protrusion 118 extends upwardly from the top end (112), the inner cavity (115) of the sphere (110) and the hemispherical protrusion (118) are fluidly connected, the inner cavity (115) of the sphere (110) and the hemispherical protrusion (118) are filled with a liquid (108);
   (b) a cone (120) having a bottom edge (121), a top edge (122) and an inner cavity (125), the bottom edge (121) of the cone (120) accepts at least the hemispherical protrusion of the sphere (110) and a portion of the sphere (110) is visible below the bottom edge (121) of the cone (120), wherein a plurality of apertures (126) is disposed at or near the top edge (122);
   (c) an arc-shaped ring (130) having a first end (131) and a second end (132), the first end (131) and the second end (132) are pivotally attached to the bottom edge (121) of the cone (120) opposite each other, the arc-shaped ring (130) can pivot in a first direction and a second direction over the sphere (110);
   (d) a cover cone (200) having a cover cone bottom edge (201) and a cover cone top edge (202), wherein the cover cone (200) is smaller in size than the cone (120), wherein the cover cone bottom edge (201) receives the top edge (122) of the cone (120) such that the cover cone (200) partially covers the plurality of apertures (126); and
   (e) a light source (300), the light source comprises a switch (301) operatively connected to a battery (302) disposed inside the light source (300), and a plurality of lights (303) operatively connected to the battery (302) and disposed at a bottom end of the light source (300);
   wherein the light source is at least partially disposed inside the cover cone (200), wherein the light source (300) is attached to the cover cone (200) by a first attachment means, wherein the cover cone (200) is attached the cone (120) by a second attachment means;
   wherein when the light source is turned "on" via the switch (301), the cover cone (300) directs a light emitted by the plurality of lights (303) through the apertures and into the inner cavity (125) of the cone (120), wherein the light illuminates the liquid (108) inside the sphere (110) that repels flies.

2. The system (100) of claim 1, wherein the liquid is water.

3. The system (100) of claim 1, wherein the cone (120) is constructed from a material comprising metal.

4. The system (100) of claim 1 further comprising a mounting ring (140) disposed on a top end of the light source (300) and opposite the lights (303), wherein the mounting ring (140) is a closed ring with a hollow center.

\* \* \* \* \*